United States Patent [19]

Haag

[11] Patent Number: 5,623,885
[45] Date of Patent: Apr. 29, 1997

[54] SINGLE SEED CONTAINER FOR MULTI ROW PLANTER PIVOTABLE BETWEEN RAISED OPERATING POSITION AND LOWERED FILLING POSITION

[76] Inventor: Steven R. Haag, R.R. #1, P.O. Box 102, Cullom, Ill. 60929

[21] Appl. No.: 506,281

[22] Filed: Jul. 24, 1995

[51] Int. Cl.⁶ .................................................. A01C 19/00
[52] U.S. Cl. .................................................. 111/200; 239/651
[58] Field of Search .................................. 111/52, 63, 64, 111/925, 200; 239/651; 222/608, 609, 610

[56] References Cited

U.S. PATENT DOCUMENTS

| | | | |
|---|---|---|---|
| 1,315,276 | 9/1919 | Blasing | 111/63 |
| 1,556,850 | 10/1925 | Kühne . | |
| 1,713,984 | 5/1929 | Soltesz | 111/63 |
| 1,972,703 | 9/1934 | Collins | 111/63 |
| 2,054,524 | 9/1936 | Scarlett | 111/63 |
| 2,748,986 | 6/1956 | Steel . | |
| 2,959,142 | 11/1960 | Stokland | 111/63 X |
| 3,014,622 | 12/1961 | Forsyth . | |
| 3,543,704 | 12/1970 | Hansen et al. | 111/63 X |
| 3,655,137 | 4/1972 | Lang | 239/651 X |
| 4,073,396 | 2/1978 | Derain . | |
| 4,332,336 | 6/1982 | Novacek | 222/609 X |
| 4,715,515 | 12/1987 | Steilen | 222/609 X |
| 4,896,615 | 1/1990 | Hood, Jr. et al. | 111/925 X |
| 4,930,431 | 6/1990 | Alexander | 111/925 X |
| 5,361,712 | 11/1994 | Townsend et al. | 111/63 X |

FOREIGN PATENT DOCUMENTS

| | | | |
|---|---|---|---|
| 2337986 | 8/1977 | France | 239/651 |
| 2485870 | 1/1982 | France | 239/651 |
| 2423822 | 12/1974 | Germany | 239/651 |
| 689531 | 4/1953 | United Kingdom | 239/651 |

Primary Examiner—Terry Lee Melius
Assistant Examiner—Christopher J. Novosad
Attorney, Agent, or Firm—Ernest Kettelson

[57] ABSTRACT

A single laterally elongated seed hopper on a multi-row planter which can be pivoted from its elevated or raised operating position on the planter to a lowered position on the ground to the rear of the planter making it easier to re-fill with seed, including a hopper support member on the planter on which the hopper seats when in its raised operating position, a plurality of feeding tubes leading from discharge ports of the support member through which seed is fed from the hopper to respective ones of the plurality of seed planting assemblies that meter and deposit seed in each row being planted, pivot arms at each side connected between the hopper on each side thereof and support frames on each side of the planter to pivot the hopper between its raised operating position and its lowered re-filling position, and hydraulic cylinders connected to operate the pivot arms powered and controlled by the hydraulic system of the tractor which pulls the planter.

18 Claims, 6 Drawing Sheets

SINGLE SEED CONTAINER FOR MULTI ROW PLANTER PIVOTABLE BETWEEN RAISED OPERATING POSITION AND LOWERED FILLING POSITION

This invention relates to the field of multi-row planters for planting rows of corn, soybean and similar seeds, and in particular to a single hopper which feeds seeds to the seed dispensing assemblies of the planter for each of its multiple rows, which is mounted for pivoting between a raised operating position and a lowered seed filling position.

BACKGROUND OF THE INVENTION

Prior art devices of which the inventor is aware include those in the following United States patents.

U.S. Pat. No. 5,361,712 discloses a cultivating apparatus for leveling, cultivating and resowing lawns or fields having a laterally elongated hopper, but one which is not mounted for pivotal movement between a raised operating position and a lowered position for filling with seed.

U.S. Pat. No. 4,930,431 discloses a no-till field implement having a large fertilizer hopper to dispense fertilizer in rows at a metered rate, but the hopper is not mounted for pivotal movement between a raised operating position and a lowered position for filling.

U.S. Pat. No. 4,896,615 discloses another laterally elongated hopper for dispensing seed, grain and the like, but one which is not mounted for pivotal movement between a raised operating position and a lowered position for filling the hopper.

U.S. Pat. No. 4,715,515 discloses a hopper and metering mechanism for an agricultural implement wherein the grain tank or hopper is more easily removable for repair or replacement by providing a minimal number of attaching points. Such tank or hopper however is not mounted for pivotal movement between a raised operating position and a lowered position for filling.

U.S. Pat. No. 4,332,336 discloses a spreading apparatus for mixed density materials, in particular fertilizer ingredients, having a single laterally extending hopper which may be pivoted on a vertical axis from its lateral operating position to a longitudinal position for pulling down the public roadways.

U.S. Pat. No. 4,073,396 discloses a movable container adjustable in height for loading on a vehicle, wherein a longitudinally extending hopper is supported in a cradle or frame between a pair of upright members. A boom mounted on a tank is connected to the forward most upright which it then lifts as it moves it forward on to rollers at the rear end of the truck bed. The boom continues to draw the front end of the cradle or frame and the hoper forward as it rolls along the rollers until it has been fully drawn onto the truck bed.

U.S. Pat. No. 3,655,137 discloses a mobile, containerized dispenser for flowable materials in which a cartridge type container is utilized, filled elsewhere with the material it is to dispense, and then lifted on to the dispensing machine by a hook carried by a trolley member, wherein the trolley rolls along a longitudinally extending boom whose rearward end can be lowered slightly below the horizontal so the trolley will roll rearwardly for connecting its hook to the cartridge, then raised slightly above the horizontal so the trolley will roll forwardly to bring the cartridge into its operating position.

U.S. Pat. No. 3,014,622 discloses a fertilizer distributor having a laterally extending hopper, but one which is not mounted for pivoting to a raised operating position and a lowered position to more easily fill.

U.S. Pat. No. 2,748,986 discloses a multiple row seeder and fertilizer side dresser which has a laterally extending hopper but it is not pivotal between a raised operating position and a lowered position for filling.

U.S. Pat. No. 1,556,850 discloses another machine for sewing seed that has a laterally extending hopper, but it is not mounted for pivotal movement between a raised operating position and a lowered position for filling.

SUMMARY OF THE INVENTION

The invention in this case provides an improvement over the prior art in that a single laterally extending hopper feeds seed corn, soybean seed, and other similar types of seed to a plurality of seed dispensing assemblies of a multi-row planter, in which the hopper can be raised by a lifting and lowering mechanism to an in-place operating position for planting the seed and lowered to ground level behind the planter when necessary to re-fill the hopper with more seed. The laterally extending hopper has a lateral dimension substantially equal to the lateral distance spanned by a plurality of laterally spaced apart seed dispensing assemblies.

A separate hopper supporting frame is bolted or welded to each side of the main planter frame. A pivot arm is pivotally connected at its lower end to the rearward end portion of each hopper supporting frame, and at its upper end to the respective outer ends of a laterally extending rod that extends across the laterally elongated hopper and slightly beyond each opposite end wall of the hopper. A hydraulic cylinder is connected at its closed end to a forward portion of each hopper supporting frame on each side, with the outer end of its ram or plunger connected to respective ones of the pivot arms. The hydraulic cylinders are connected to and powered by the hydraulic operating system of the tractor. When the ram or plunger of each hydraulic cylinder is retracted, the pivot arms pivot upwardly in an upwardly inclined arc carrying the hopper upward to a position immediately above the pivot connection of the pivot arms to the hopper support frame on each side of the planter. The ram of each cylinder is retracted further a small amount which pivots the pivot arms and hopper a small further distance forward, but in a downwardly inclined arc to seat the narrow outlet chute of the hopper down into a laterally elongated dispensing trough.

The dispensing trough has a plurality of outlet ports connected to flexible feeding tubes which at their other ends are connected to respective ones of a plurality of seed dispensing assemblies, one provided for each row of the multi-row planter. A laterally elongated closure plate is seated along the bottom wall of the dispensing trough, having apertures that come into registration with the outlet ports of the dispensing trough when the closure plate is slidably moved to its open, seed dispensing position, and having imperforate solid portions which cover those outlet ports when moved to the closed, non-dispensing position. Corresponding discharge apertures are provided in the bottom wall of the hopper's outlet chute which are in registration with the outlet ports of the dispensing trough when the hopper's outlet chute is seated therein and the closure plate is slidably moved to its open, seed dispensing position.

The dispensing trough is supported above the planter and above the seed dispensing assemblies of each row by support members at each opposite side connected at their lower ends to a portion of the planter frame on each opposite side.

3

When the seed in the hopper has all been dispensed and planted, the hopper is refilled by operating the hydraulic cylinders to extend their respective rams. This pivots the pivot arms rearwardly, at first in an upwardly inclined arc until the pivot arms are directly above their pivot connections to the rearward portions of the hopper support frame. This upwardly inclined movement raises the hopper's outlet chute up and out from the dispensing trough in which it was seated. The bottom wall of the hopper's outlet chute clears the side walls of the dispensing trough during such upwardly inclined portion of the arc as the pivot arms are pivoted rearwardly. As the pivot arms are pivoted further in the rearward direction they begin to move in a downwardly directed arc until the bottom wall of the hopper's outlet chute is resting on the ground.

The open upper wall of the hopper is then at a convenient lowered height making it easier for a workman to pour seed into the hopper from seed sacks or bushel baskets. The laterally elongated hopper when lowered to ground level for filling also makes it readily adaptable such as a wagon or truck having a discharge spout directed into the hopper as the wagon or truck is moved alongside.

A laterally extending hopper closing plate is provided to cover the discharge apertures of the hopper when in its closed position and to open them when in its open position.

DESCRIPTION OF PREFERRED EMBODIMENT

Figure 1:
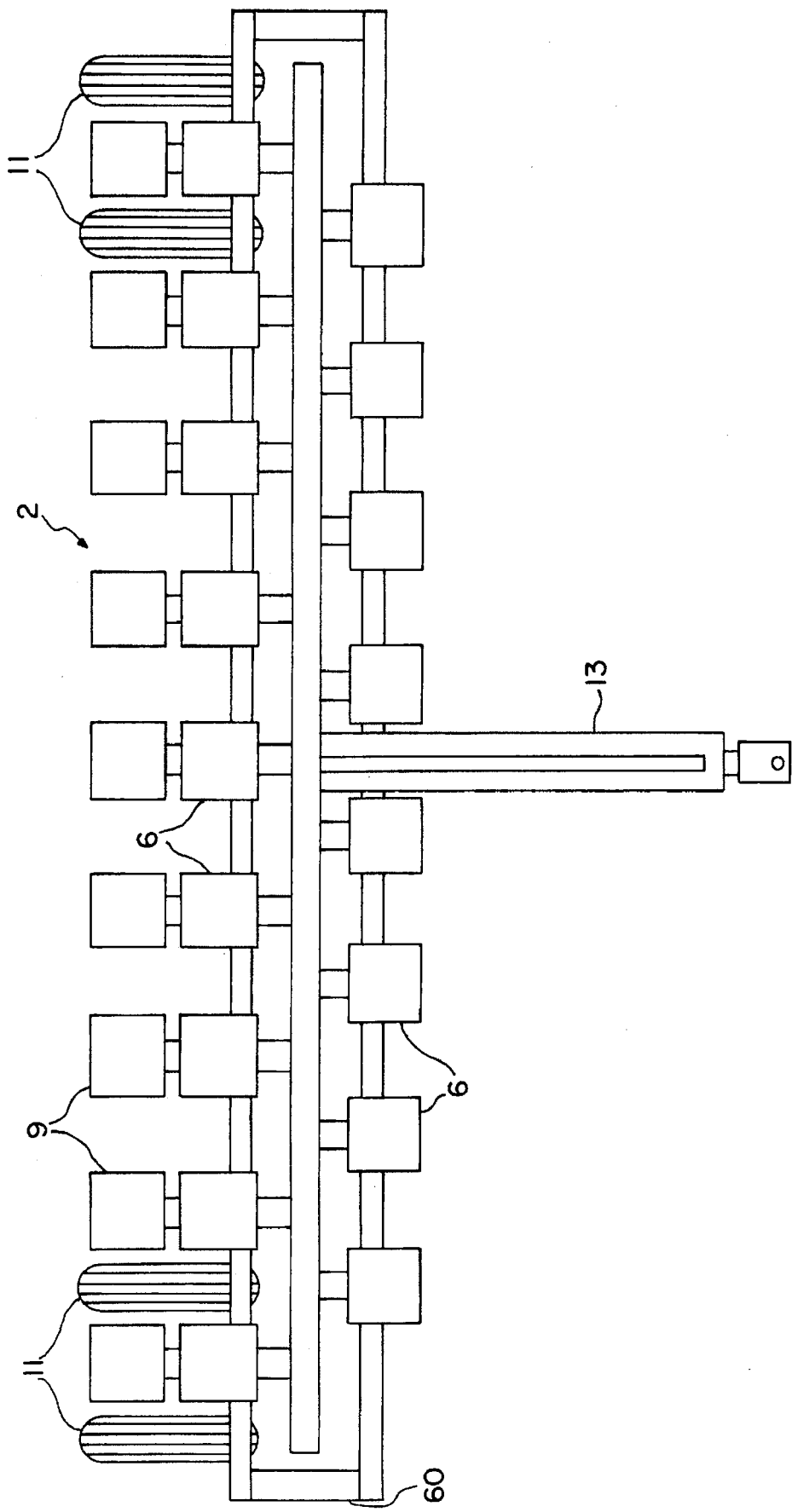
FIG. 1 is a plan view of an existing prior art planter of the type on which the laterally extending single seed hopper in accordance with this invention may be installed for pivoting between a lowered position for loading seed and a raised position for feeding seed to the individual seed dispensing assemblies of each row.

A seed planter 2 for planting corn, soybeans and the like in accordance with this invention has a laterally extending hopper 4 that is supported above and across the plurality of individual seed boxes 6 and their corresponding seed dispensing assemblies 8, by a raising and lowering mechanism 10. The laterally extending hopper 4 has a lateral dimension substantially equal to the lateral dimension spanned by a plurality of laterally spaced apart seed dispensing assemblies 8.

A planter of the existing prior art type for planting corn, soybeans and the like is illustrated in FIG. 1. It includes two laterally extending rows of spaced apart seed boxes 6 toward the front, and a single laterally extending row of fertilizer boxes 9 along the rear edge of the planter. The planter is supported by a set of dual wheels 11 at each end, and includes a tongue 13 projecting from the front for connection to a tractor. The seed boxes 6 of the existing prior art planters are connected directly to the seed dispensing assemblies 8 which are described in more detail hereinbelow. The seed dispensing assemblies 8 receive seed from the boxes and meter out the number of seeds to be planted per lineal inch or foot in each row. The metered seed drops from the seed dispensing assemblies 8 into a trenching shoe 15, which is lowered into the ground to provide a trench for the seed to be planted in after which the trench is covered with earth by a pair of disks 17 rotating on angularly positioned axles to form a seed bed covering of earth over the trench.

Figure 2:
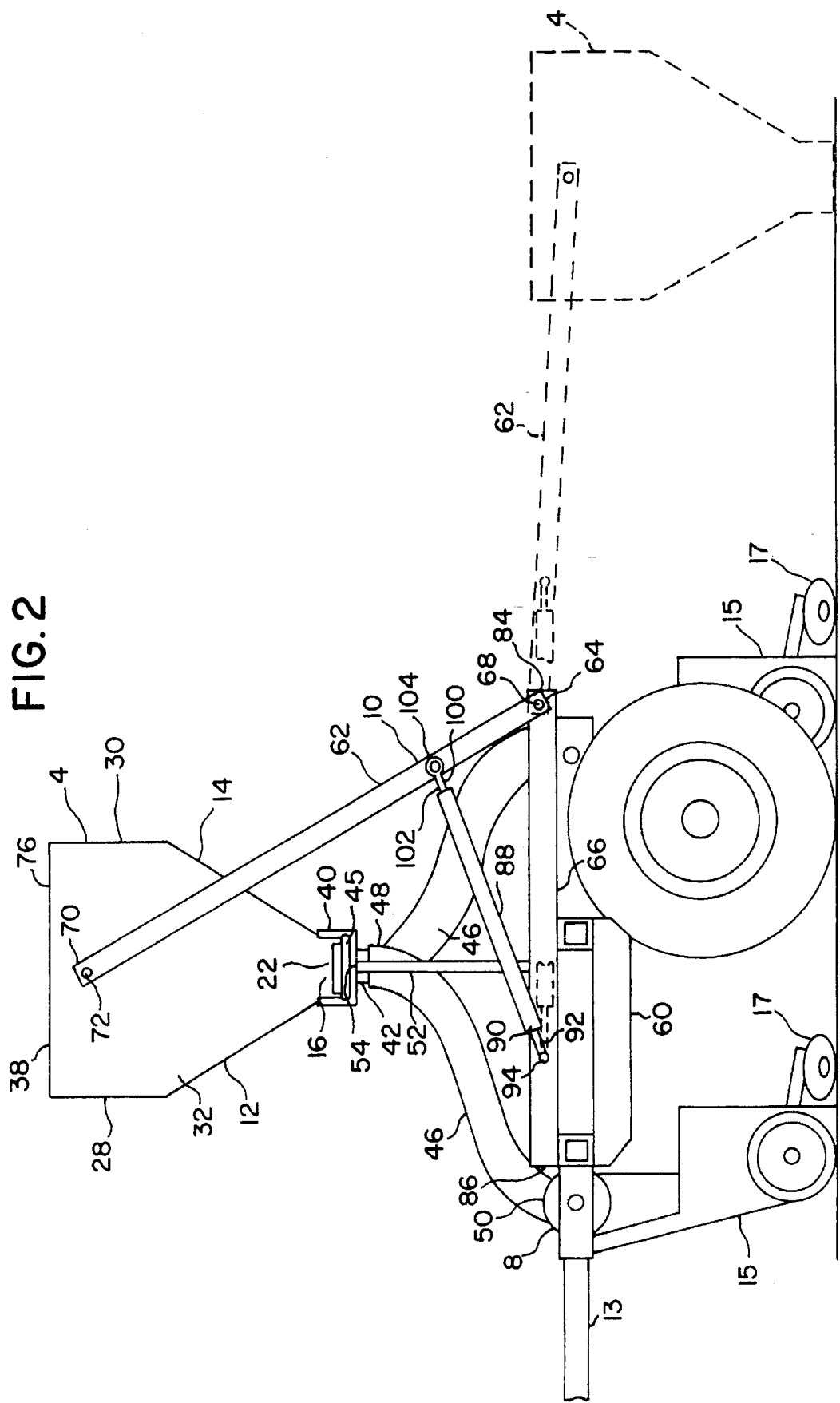
FIG. 2 is a side elevation view of one side of a planter of the type shown in FIG. 1 but with the seed boxes and fertilizer boxes removed, illustrating the laterally extending seed hopper in accordance with this invention in its raised and operating position, also illustrating in broken lines a phantom view of the hopper when lowered to its seed filling position to the rear of the planter, also illustrating feeding tubes extending between the hopper and seed dispensing assemblies located at one side of the planter and one side of the hopper.
Figure 3:
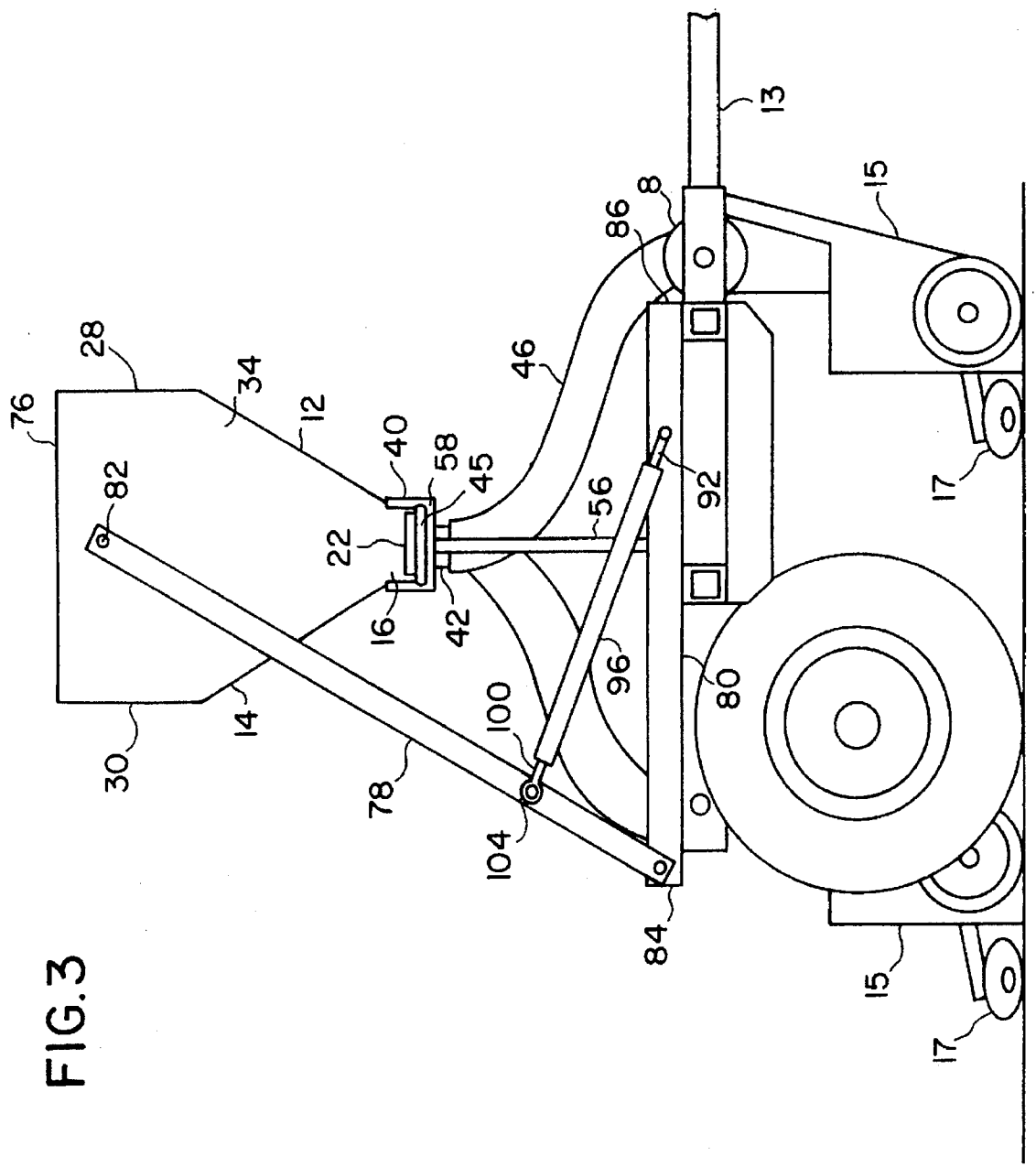
FIG. 3 is a side elevation view of the other side of the planter shown in FIG. 2 and of the other side of the laterally extending seed hopper in its raised and operating position, also illustrating feeding tubes extending between the hopper and seed dispensing assemblies located at the other side of the planter and other side of the hopper from that shown in FIG. 2.
Figure 4:
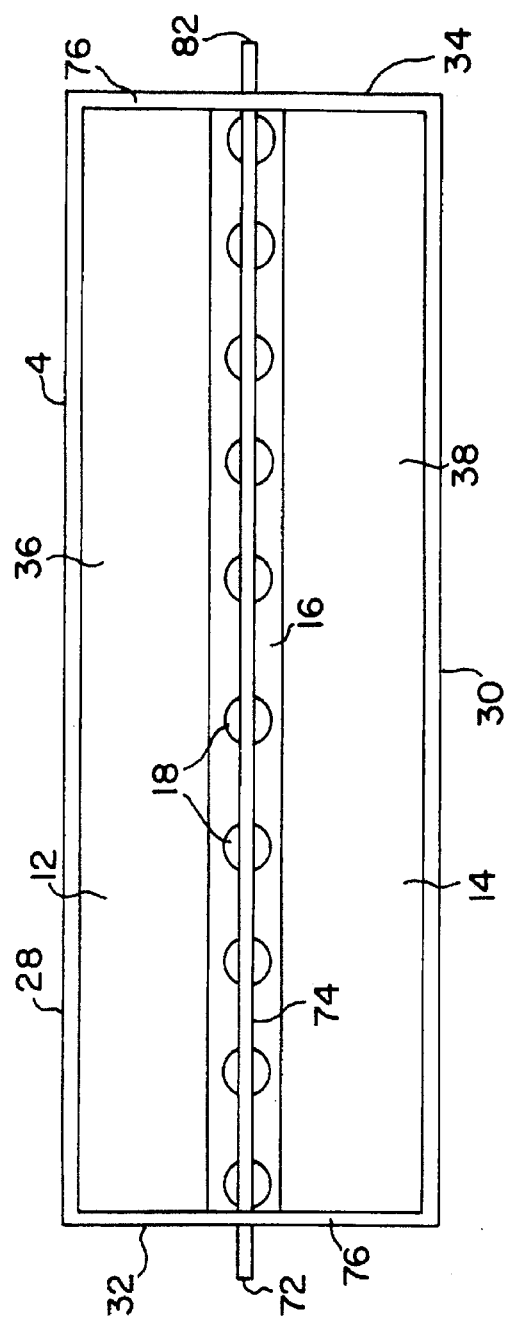
FIG. 4 is a top plan view of the laterally extending hopper in accordance with this invention, with its slidable closure plate removed to illustrate the outlet apertures of the laterally extending hopper.
Figure 5:
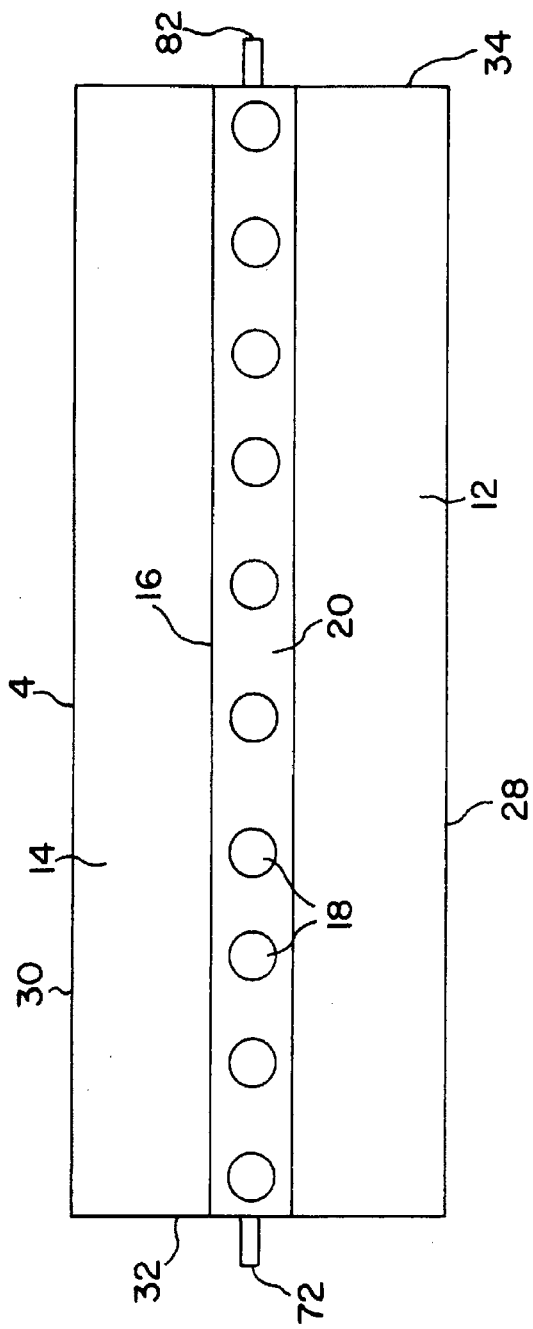
FIG. 5 is a bottom plan view of the hopper shown in FIG. 4.
Figure 6:
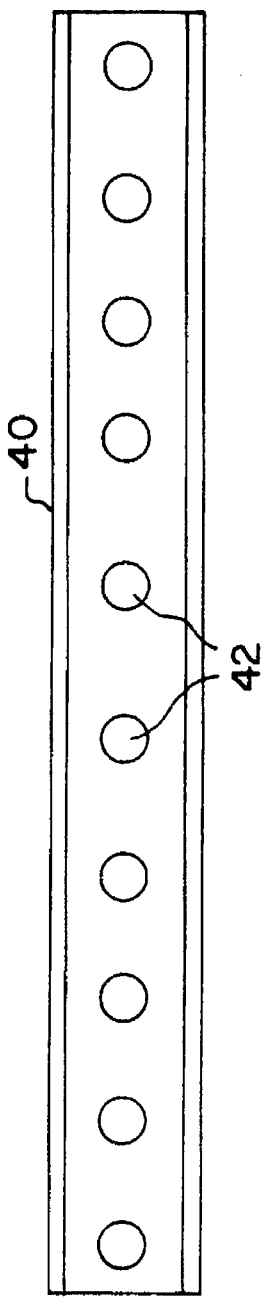
FIG. 6 is a top plan view of the dispensing trough in which the outlet chute of the hopper is seated when in its raised and operating position.
Figure 7:
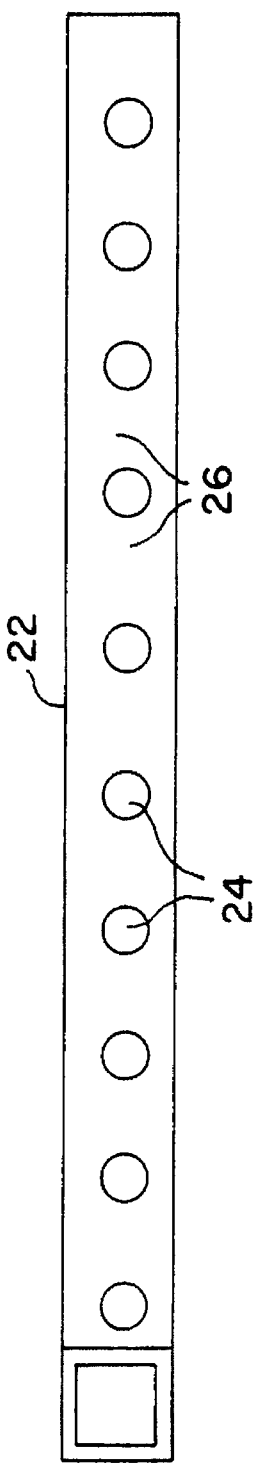
FIG. 7 is a plan view of the elongated closure plate which seats in the bottom of the hopper's outlet chute for sliding between an aperture open and aperture closed position.
Figure 9:
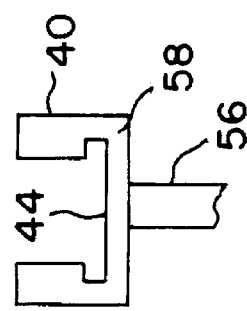
FIG. 9 is an end view of the dispensing trough with the closure plate of FIG. 8 removed to illustrate the undercut grooves in which the closure plate is received.
Figure 8:
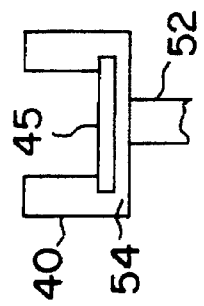
FIG. 8 is an end view of the dispensing trough showing an optional and alternative closure plate received therein.
Figure 10:
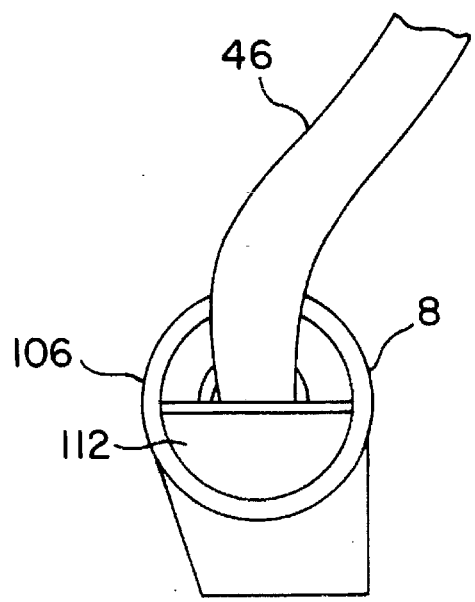
FIG. 10 is a side elevation view of one of the seed dispensing assemblies the planter has for each row, showing a portion of one of the feeding tubes connected thereto to illustrate how seed from the hopper is fed into the seed dispensing assemblies.
Figure 11:
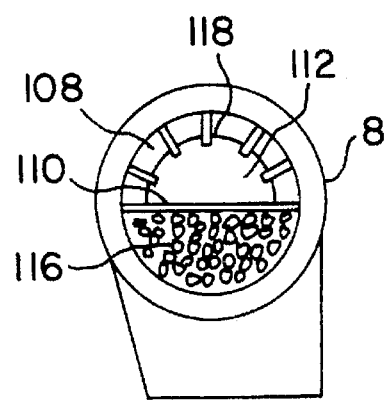
FIG. 11 is a side elevation view of the seed dispensing assembly of FIG. 10 with its cover plate on the seed receiving side removed to show a portion of the seed pick-up and metering rotary plate assembly.
Figure 12:
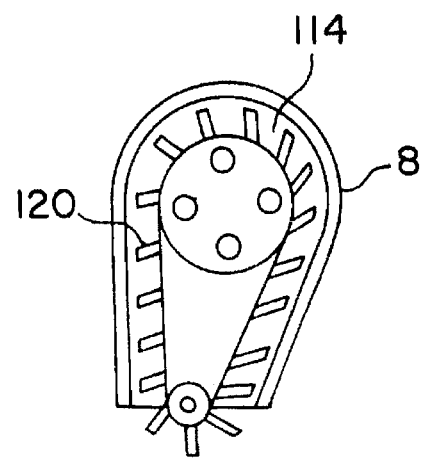
FIG. 12 is a side elevation view of the opposite side of the seed dispensing assembly of FIGS. 10 and 11 with its cover plate on the seed discharge side removed to show the seed dispensing conveyor.

The individual seed boxes 6 may be removed for planters equipped with the laterally extending hopper 4, since seed from the hopper 4 is fed directly into the respective seed dispensing assemblies 8 from the laterally extending hopper 4. To more clearly illustrate the relevant parts of the present invention, the seed boxes 6 have been omitted from FIGS. 2 and 3, as have the fertilizer boxes 9 and their fertilizer dispensing mechanism by which fertilizer is applied adjacent to each planted row.

The hopper 4 includes oppositely disposed inclined lower side walls 12 and 14 which converge as they extend downwardly to terminate at a laterally elongated outlet chute 16 from which seed in the hopper 4 is dispensed through a plurality of spaced apart outlet apertures 18 of the bottom wall 20 of the outlet chute 16 for feeding to the seed dispensing assemblies 8.

A laterally elongated closure plate 22 is slidably mounted across the laterally extending bottom wall 20 of the outlet chute 16, having a plurality of spaced apart outlet apertures 24 corresponding to the outlet apertures 18 through the bottom wall 20 of the outlet chute 16. The slidable closure plate 22 is slidable across the bottom wall 20 of outlet chute 16 between an outlet aperture open position wherein the outlet apertures 18 of the outlet chute 16 are in registration with the outlet apertures 24 of the closure plate 22 and an outlet aperture closed position wherein the solid portions 26 of the closure plate 22 between the apertures 24 are in position to cover and close the outlet apertures 18 of the outlet chute 16 of the hopper 4.

The hopper 4 includes an upwardly extending upper side wall 28 extending upwardly from inclined lower side wall 12 and an oppositely disposed upper side wall 30 extending upwardly from inclined lower side wall 14, substantially parallel to its opposite upper side wall 28. The hopper 4 includes opposite end walls 32 and 34 which with the side walls define a hopper cavity 36 opening at the top to open top wall 38.

The outlet chute 16 of the hopper 4 is received in and seats in an elongated laterally extending seed dispensing trough 40 having seed dispensing ports 42 through its bottom wall 44. The bottom wall 20 of the outlet chute 16 of hopper 4 faces the bottom wall 44 of the seed dispensing trough 40 with its outlet apertures 18 in registration with respective ones of the seed dispensing ports 42 of the seed dispensing trough 40 when the slidable closure plate 22 is moved to its outlet aperture open position. A closure plate 45 may also be provided in the dispensing trough 40 which also has spaced apart apertures and solid portions therebetween corresponding to those of closure member 22 in the outlet chute 16 of the hopper 4, for registration with dispensing ports 42 when slidably moved to the open position and to block dispensing ports 42 when moved to the closed position.

Feeding tubes 46 extend downwardly from their connection at their upper ends 48 to respective ones of the seed dispensing ports 42 of the seed dispensing trough 40, to terminate at their lower ends 50 which are connected to respective ones of the seed dispensing assemblies 8.

The seed dispensing assemblies are known to the prior art and need not be described in detail here. In conventional prior art planters they are connected to receive seed dispensed from the individual seed boxes 6 of conventional prior art planters. The seed dispensing assemblies include a mechanism to meter the number of individual seeds to be dropped per lineal foot through the planting shoes of the planter which extend into the ground the desired depth as they are moved along the rows being planted, after which covering wheels or rollers of the planter cover the seed which has been planted with earth.

The laterally extending seed dispensing trough is supported laterally across the planter above the seed dispensing assemblies by an upwardly extending support member 52 at one end 54 and by a second upwardly extending support member 56 at its opposite end 58. The lower ends of support members 52 and 56 are secured to respective facing portions of the planter frame 60.

The raising and lowering mechanism 10 raises the hopper 4 to its operating position above the seed dispensing assemblies 8 with its outlet chute 16 seated in the seed dispensing trough 40, and lowers the hopper 4 to its filling position on the ground behind the planter 2. The raising and lowering mechanism 10 includes a first elongated pivot arm 62 having its lower or inner end 64 pivotally connected to a first hopper support frame 66 by a pivot pin or shaft 68, with its upper or outer end 70 pivotally connected to one end 72 of an elongated pivot and support rod 74 which extends across the hopper 4 through each opposite end wall 32 and 34 near the upper edges 76 thereof and at substantially their midpoint between upper side walls 28 and 30.

A second elongated pivot arm 78 has its lower or inner end 64 pivotally connected to a second hopper support frame 80 on the opposite side of the planter 2 by a pivot pin or shaft 68, with its upper or outer end 70 pivotally connected to the opposite end 82 of the pivot and support rod 74.

The hopper support frames 66 and 80 are secured to facing portions of the planter frame 60, at a location which is below and substantially centered on the laterally extending seed dispensing trough 40 at each opposite end thereof. Each hopper support frame 66 and 80 have a rearwardly facing end 84 and a forwardly facing end 86. The rearwardly facing end 84 extends rearwardly of the seed dispensing trough 40 substantially the same distance as the forwardly facing end 86 extends forwardly therefrom.

The pivot pins or shafts 68 to which the lower or inner ends 64 of the pivot arms 62 and 78 are connected extend outwardly from their respective hopper support frames 66 and 80 forwardly a short distance from their rearwardly facing ends 84. Thus, when the hopper 4 is in its raised operating position with its outlet chute 16 seated in the seed dispensing trough 40, the elongated pivot arms 62 and 78 extend upward at a forward leaning diagonal. Their upper or outer ends 70 are forward of their lower or inner ends 64. Thus when the pivot arms 62 and 78 are pivoted from their position which puts the hopper 4 in its raised operating position in a rearward direction which will lower the hopper 4 to the ground at the rear of the planter 2, the upper or outer ends 70 first move in an upwardly directed arc as they begin to pivot rearwardly which thereby raises the outlet chute 16 of the hopper 4 up from and out of the seed dispensing trough 40 in which it had been seated. The upper or outer ends 70 of the pivot arms 62 and 78 continue to move in an upwardly directed arc as they are pivoted rearwardly until they are directly above, or vertically in line with, their lower or inner ends 64 pivotally connected to their respective hopper support frames 66 and 80 adjacent their rearwardly facing ends 84. The upper or outer ends 70 of the pivot arms 62 and 78 thereafter begin to pivot in a downwardly directed arc as they are pivoted further in the rearward direction until the hopper 4 is seated on the ground to the rear of the planter 2.

A first hydraulic cylinder 88 has its closed or rearward end 90 connected to an articulating link member 92 which in turn is pivotally connected to the forwardly facing end 86 of hopper support frame 66 by a pivot pin or shaft 94.

A second hydraulic cylinder 96 has its closed or rearward end 90 connected to an articulating link member 98 which in turn is pivotally connected to the forwardly facing end 86 of hopper support frame 80 on the opposite side of the planter 2 by a pivot pin or shaft 94.

Each hydraulic cylinder has a piston rod or plunger 100 extending from its forward or working end 102, movable outwardly therefrom to an extended position and inwardly thereof to a retracted position. The outer connecting end 104 of each plunger 100 is connected to respective ones of the elongated pivot arms 62 and 78 at an intermediate location between their respective upper or outer ends 70 and their lower or inner ends 64 and closer to their lower or inner ends 64.

The hydraulic cylinders are connected to and powered by the hydraulic operating mechanism of the tractor which pulls the planter. When the hopper 4 is in its raised operating position, the plungers 100 are in their substantially retracted position. When it is desired to lower the hopper 4 to the ground to the rear of the planter 2 for filling with seed, the hydraulic operating mechanism is operated to move the plungers 100 toward their extended positions which pivots the pivot arms 62 and 78 rearwardly, first in an upwardly inclined arc for a short ways to lift the outlet chute 16 of the hopper 4 from its seat in the seed dispensing trough 40 and then in a downwardly inclined arc until the hopper 4 is resting on the ground.

The laterally elongated hopper 4 may then be conveniently filled with enough seed to supply all of the plurality of seed dispensing assemblies 8 the planter may have. Each row to be planted has one seed dispensing assembly 8. Seed planters of the type described herein may have as many as twenty four seed dispensing assemblies to plant twenty four rows during each pass across the field, and even more than twenty four. The laterally elongated hopper 4 in accordance with this invention may also be used with seed planting drills in which each seed dispensing assembly for each row is much closer to its adjacent seed dispensing mechanism than for machines commonly known as planters.

The seed dispensing assemblies 8 each comprise a housing 106 having a rotary shaped chamber 108. A divider plate 110 separates the chamber 108 into a seed receiving side 112 and a seed discharging side 114. The feeding tube 46 leading from the hopper 4 are connected to discharge seed into the chamber pocket 116 on the seed receiving side 112. A rotary seed metering and pick-up plate assembly 118 is mounted for rotation in the chamber 108 having a plurality of fingers which pick up and carry individual seeds from the pocket 116 on the seed receiving side 112 to a conveyor assembly 120 on the seed discharging side 114 which conveys the individual seeds into the trenching shoe 15 for dropping into the seed trench as the planter is moved linearly along the seed rows by the tractor.

Conventional planters have individual seed boxes that have to be filled for each row, which requires the workman to lift heavy sacks of seed corn, or soybean seed, or the like, up to the level of each individual seed box opening and pour the seed into each box manually. That is an exhausting and time consuming operation. With the single hopper 4 in accordance with the present invention which extends laterally across and above all of the seed dispensing assemblies of the planter, the hopper 4 is first of all lowered to ground level so even if filled manually by a workman he does not have to lift the heavy sacks of seed as high as he does to reach the individual seed boxes of conventional planters. Secondly, the laterally elongated hopper 4 lends itself to filling by machine or automation. The seed can be loaded in bulk into a supply wagon or truck box having a dispensing chute that can be directed into position to fill the hopper 4. The wagon or truck can then be moved along the hopper 4 from one end wall 32 to the opposite end wall 34 while seed is flowed therein until the hopper is completely filled.

After the hopper 4 is filled, the hydraulic operating mechanism is operated to retract the plungers 100 of the hydraulic cylinders 88 and 96 which pivots the pivot arms 62 and 78 forwardly, first in an upwardly inclined arc until they reach the position in which they are vertical during which time the hopper 4 is being raised, and then for a short distance in a downwardly inclined arc while moving forwardly which lowers the hopper 4 to direct its laterally elongated outlet chute 16 to seat in the laterally elongated seed dispensing trough 40.

The laterally elongated closure plate 22 is then moved from its aperture closed position to its aperture open position, whereupon the outlet apertures 18 of the hopper's outlet chute 16 are in open communication with the seed dispensing ports 42 of the trough 40 and the feeding tubes 46 leading to each of the seed dispensing assemblies 8 for delivering seed thereto from the hopper 4.

I claim:

1. A multi-row planter having a plurality of laterally spaced apart seed dispensing assemblies for planting seeds in a plurality of laterally spaced apart longitudinal rows, comprising a refillable seed container having an opening to receive seed therethrough to fill said container, discharge means to discharge seed from said seed container, conveying means comprising first conveying means to receive seed from said discharge means and convey to a first one of said plurality of seed dispensing assemblies, a second conveying means to receive seed from said discharge means and convey to a second one of said plurality of seed dispensing assemblies, container support means to support said seed container in an operating position on said planter in communication with said conveying means, and raising and lowering means operable to move said seed container between a raised position wherein it is supported in said operating position by said container support means and a lowered position wherein said seed container is lowered to the ground to be more easily filled with seed.

2. A multi-row planter as set forth in claim 1, wherein said refillable seed container comprises a laterally elongated hopper which when in said raised position is supported above and across a plurality of said seed dispensing assemblies having a lateral dimension corresponding to the lateral distance spanned by a plurality of at least two of said laterally spaced apart seed dispensing assemblies.

3. A multi-row planter as set forth in claim 2, wherein said opening to receive seed therethrough to fill said container comprises an open upper wall of said laterally elongated hopper.

4. A multi-row planter as set forth in claim 3, wherein said discharge means includes an outlet chute of said laterally elongated hopper, said hopper including first and second laterally elongated side walls, a portion of which converge as they extend downwardly, said first side wall facing forward of said planter and terminating downwardly in a first side wall lower edge, said second side wall facing rearwardly of said planter and terminating downwardly in a second side wall lower edge, said outlet chute extending laterally along and connected to said lower edges of said first and second side walls, said outlet chute having a laterally elongated bottom wall having a downwardly facing planar surface, outlet aperture means through said bottom wall positioned for communication with said conveying means when said hopper is raised to its said operating position on said container support means.

5. A multi-row planter as set forth in claim 4, wherein said container support means includes a laterally elongated trough member having a first laterally extending trough side wall facing forwardly, a second laterally extending trough side wall facing rearwardly, a bottom trough wall extending laterally between said first and second trough said walls to provide a seat for said outlet chute to be received in when said hopper is raised to its said operating position, a first support member connected between a frame portion of said planter on one side thereof and one end of said laterally extending trough member, a second support member connected between a frame portion of said planter on the opposite side thereof and the opposite end of said laterally extending trough member, said bottom trough wall having communicating aperture means therethrough positioned for communication with said outlet aperture means of said bottom wall of said outlet chute and said conveying means when said hopper is raised to its said operating position with its said outlet chute seated on said bottom trough wall.

6. A multi-row planter as set forth in claim 5, wherein said conveying means comprise a plurality of seed carrying conduits connected between said communicating aperture means of said bottom trough wall and respective ones of said seed dispensing assemblies to convey seed from said hopper to each one of said plurality of seed dispensing assemblies when said hopper is raised to its said operating position with its said outlet chute seated on said bottom trough wall.

7. A multi-row planter as set forth in claim 5, wherein said communicating aperture means of said bottom trough wall of said laterally elongated trough member comprises a plurality of spaced apart communicating apertures equal in number to the number of seed dispensing assemblies in said plurality thereof, and a plurality of imperforate solid portions of said bottom trough wall between respective adjacent ones of said spaced apart communicating apertures.

8. A multi-row planter as set forth in claim 7, including a trough closing member mounted on said trough member for movement between a communicating aperture open and communicating aperture closed position, said trough closing member having closing means to close said communicating apertures of said bottom trough wall when said trough closing member is in its said communicating aperture closed position and having opening means to open said communicating apertures of said bottom trough wall when said trough closing member is in its said communicating aperture open position.

9. A multi-row planter as set forth in claim 4, wherein said outlet aperture means through said bottom wall of said outlet chute comprises a plurality of spaced apart outlet apertures equal in number to the number of seed dispensing assemblies in said plurality thereof, and a plurality of imperforate solid portions of said bottom wall of said outlet chute between respective adjacent ones of said spaced apart outlet apertures.

10. A multi-row planter as set forth in claim 9, including an outlet chute closing member mounted on said outlet chute for movement between an outlet aperture open and outlet aperture closed position, said outlet chute closing member having closing means to close said outlet apertures of said bottom wall of said outlet chute when said outlet chute closing member is in its said outlet aperture closed position and having opening means to open said outlet apertures of said bottom wall of said outlet chute when said outlet chute closing member is in its said outlet aperture open position.

11. A multi-row planter as set forth in claim 3, wherein said discharge means includes an outlet chute of said laterally elongated hopper, said hopper including first and second laterally elongated side walls, a portion of which converge as they extend downwardly, said first side wall facing forward of said planter and terminating downwardly in a first side wall lower edge, said second side wall facing rearwardly of said planter and terminating downwardly in a second side wall lower edge, said outlet chute extending laterally along and connected to said lower edges of said first and second side walls, said outlet chute having a laterally elongated bottom wall having a downwardly facing planar surface, outlet aperture means through said bottom wall positioned for communication with said conveying means when said hopper is raised to its said operating position on said container support means.

12. A multi-row planter as set forth in claim 11, wherein said outlet aperture means through said bottom wall of said outlet chute comprises a plurality of spaced apart outlet apertures equal in number to the number of seed dispensing assemblies in said plurality thereof, and a plurality of imperforate solid portions of said bottom wall of said outlet chute between respective ones of said spaced apart outlet apertures.

13. A multi-row planter having a plurality of laterally spaced apart seed dispensing assemblies for planting seeds in a plurality of laterally spaced apart longitudinal rows, comprising a refillable seed container having an opening to receive seed therethrough to fill said container, discharge means to discharge seed from said seed container, conveying means to receive seed from said discharge means and convey to respective ones of said plurality of seed dispensing assemblies, container support means to support said seed container in an operating position on said planter in communication with said conveying means, and raising and lowering means operable to move said seed container between a raised position wherein it is supported in said operating position by said container support means and a lowered position wherein said seed container is lowered to the ground to be more easily filled with seed, wherein said refillable seed container includes a first side edge lying in a first vertical plane, a second and opposite side edge lying in a second vertical plane which is substantially parallel to said first vertical plane, said raising and lowering means comprise a first elongated pivot arm connected between said container at said first side edge and spaced apart first pivot arm support means affixed to said planter at points in said first vertical plane, a second elongated pivot arm connected between said container at said second side edge and spaced apart second pivot arm support means affixed to said planter at points in said second vertical plane, and power means to pivot said first and second pivot arms with said refillable seed container therebetween in an arcuate path between said first and second vertical planes from said raised position of said refillable seed container to said lowered position thereof and from said lowered position back up to said raised position.

14. A multi-row planter as set forth in claim 13, wherein said first and second vertical planes extend substantially perpendicular to the direction in which said plurality of seed dispensing assemblies are laterally spaced apart, said first and second pivot arms with said refillable seed container therebetween being raised and lowered in an arcuate path which extends in a direction normal to the said direction in which said plurality of seed dispensing assemblies are laterally spaced apart, said refillable seed container being to the rear of said planter when pivoted to its said lower position.

15. A multi-row planter as set forth in claim 13, wherein said first pivot arm support means includes a first pivot arm support member having a forwardly facing end and a rearwardly facing end, said second pivot arm support means includes a second pivot arm support member having a forwardly facing end and a rearwardly facing end, said first and second pivot arm support members being at a level below said refillable seed container and said discharge means to discharge seed from said container when said seed container is in its said raised and operating position, said first elongated pivot arm being pivotally connected to said first pivot arm support member at a first pivot location inwardly from said rearwardly facing end thereof, said second elongated pivot arm being pivotally connected to said second pivot arm support member at a second pivot location inwardly from said rearwardly facing end thereof, said raised and operating position at which said container and said discharge means are located when said seed container is in its said raised and operating position is forwardly of as well as above said first and second pivot locations on said first and second pivot arm support members, whereby said container is at the highest point of said arcuate path when said first and second pivot arms are directly above said first and second pivot points whereupon said container is lowered in a descending arc to seat on said container support means when being pivoted from said highest point in the direction toward its said raised position and lifted in an ascending arc to separate from said seat on said container support means when being pivoted toward said highest point in the opposite direction toward its said lowered position.

16. A multi-row planter as set forth in claim 15, wherein said power means to pivot said first and second pivot arms in said arcuate path includes a first hydraulic cylinder and reciprocating ram connected between said first pivot arm and said first pivot arm support member, and a second hydraulic cylinder and reciprocating ram connected between said second pivot arm and said second pivot arm support member.

17. A multi-row planter as set forth in claim 16, wherein said refillable seed container comprises a laterally elongated hopper which when in said raised position is supported above and across a plurality of said seed dispensing assemblies having a lateral dimension corresponding to the lateral distance spanned by a plurality of at least two of said laterally spaced apart seed dispensing assemblies.

18. A multi-row planter as set forth in claim 17, wherein said opening to receive seeds therethrough to fill said container comprises an open upper wall of said laterally elongated hopper.

\* \* \* \* \*